United States Patent
Boss et al.

(10) Patent No.: US 11,030,616 B2
(45) Date of Patent: Jun. 8, 2021

(54) COGNITIVE MOBILE WALLET MANAGEMENT

(71) Applicant: INTERNATIONAL BUSINESS MACHINES CORPORATION, Armonk, NY (US)

(72) Inventors: Gregory J. Boss, Saginaw, MI (US); Wouter Denayer, Merelbeke (BE); Rick A. Hamilton, II, Charlottesville, VA (US); Ninad D. Sathaye, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 357 days.

(21) Appl. No.: 15/440,281

(22) Filed: Feb. 23, 2017

(65) Prior Publication Data

US 2018/0240108 A1   Aug. 23, 2018

(51) Int. Cl.
*G06Q 30/06* (2012.01)
*G06Q 20/36* (2012.01)
*G06Q 20/40* (2012.01)
*G06Q 40/02* (2012.01)

(52) U.S. Cl.
CPC ....... *G06Q 20/3676* (2013.01); *G06Q 20/405* (2013.01); *G06Q 30/0601* (2013.01); *G06Q 40/02* (2013.01)

(58) Field of Classification Search
CPC .................................... G06Q 30/0601–0645
USPC ................................................ 705/26.1–27.2
See application file for complete search history.

(56) References Cited

U.S. PATENT DOCUMENTS

| | | | |
|---|---|---|---|
| 7,698,221 B2 | 4/2010 | Blinn et al. | |
| 2005/0131772 A1* | 6/2005 | Chow | G06Q 30/06 705/26.7 |
| 2006/0178984 A1* | 8/2006 | Anderson | G06Q 20/04 705/39 |
| 2009/0288012 A1* | 11/2009 | Hertel | G06Q 20/02 715/738 |
| 2014/0129435 A1 | 5/2014 | Pardo et al. | |
| 2015/0220915 A1 | 8/2015 | Rosenberg | |
| 2015/0220914 A1 | 9/2015 | Purves et al. | |
| 2015/0262166 A1 | 9/2015 | Singh et al. | |
| 2015/0379488 A1* | 12/2015 | Ruff | G06Q 20/108 705/36 R |

(Continued)

OTHER PUBLICATIONS

Jose, M. (2011). Digital currency wallet for mobile devices (Order No. 1504486). Available from ProQuest Dissertations and Theses Professional. (902853924). Retrieved from https://dialog.proquest.com/professional/docview/902853924?accountid=131444.*

(Continued)

*Primary Examiner* — Resha Desai
(74) *Attorney, Agent, or Firm* — Jay Wahlquist; Andrew D. Wright; Roberts, Calderon, Safran & Cole, P.C.

(57) ABSTRACT

Systems and methods for cognitive mobile wallet management are disclosed. In embodiments, a method comprises: obtaining, by a computing device, user contextual data; determining, by the computing device, a potential user purchase and an associated purchase category; and dynamically determining, by the computing device, a flexible spending rule for the purchase category based on one or more stored spending rules and the contextual data, wherein the flexible spending rule changes an amount of currency available to a user through the computing device.

19 Claims, 5 Drawing Sheets

(56) References Cited

U.S. PATENT DOCUMENTS

2016/0034932 A1 2/2016 Sion et al.
2016/0155116 A1 6/2016 Hanson et al.

OTHER PUBLICATIONS

Anonymous, "BBVA Wallet's new functions give users total control of their cards", May 26, 2015, 2 pages.
Purcher, "Apple reveals new Security Control Features for Future iWallet", http://www.patentlyapple.com/patently-apple/2017/07/apple-reveals-new-security-control-features-for-future-iwallet.html, Patently Apple, Accessed Feb. 6, 2017, 9 pages.
Campbell, "Apple nabs parental controls patent for 'iWallet' transactions", http://appleinsider.com/articles/12/03/06/new_apple_patent_outlines_rules_for_itunes_based_iwallet_transactions, AppleInsider, Mar. 6, 2012, 2 pages.
Diaz, "Oink is a Digital Wallet App With Parental Controls", http://www.androidheadlines.com/2015/09/oink-is-a-digital-wallet-app-with-parental-controls.html, AndroidHeadlines, Sep. 18, 2015, 5 pages.
White, "Virtual Piggy banking on kids making parent-monitored online payments", http://www.latimes.com/business/la-fi-stock-spotlight-piggy-20140804-story.html, Los Angeles Times, Aug. 3, 2014, 6 pages.
Anonymous, "Oink (payment service)", https://en.wikipedia.org/wiki/Oink_(payment_service), Wikipedia, Accessed Feb. 6, 2017, 4 pages.
Chandorkar, "The Future of Indian Digital Wallets", https://www.capgemini.com/blog/capping-it-off/2015/03/the-future-of-indian-digital-wallets, Capgemini, Capping IT Off, Mar. 29, 2015, 2 pages.
Toren, "The Color of Your Website Has a Huge Impact on What People Buy", http://www.businessinsider.com/psych-101-for-your-website-the-color-factor-2011-7?IR=T, Business Insider, Strategy, Jul. 15, 2011, 3 pages.
Hamm, "10 Simple Ways to Beat Impulse Buying", http://www.thesimpledollar.com/10-simple-ways-to-beat-impulse-buying/, The Simple Dollar, Sep. 22, 2014, 6 pages.
Fottrell, "These scents will make you spend more", http://www.marketwatch.com/story/these-scents-will-make-you-spend-more-2014-11-21, MarketWatch, Nov. 26, 2014, 2 pages.
Anonymous, "Sensing Air Quality the Easy Way", http://cordis.europa.eu/result/rcn/173496_en.html, CORDIS, IAQSense Result in Brief, Dec. 11, 2015, 2 pages.

* cited by examiner

COGNITIVE MOBILE WALLET MANAGEMENT

BACKGROUND

The present invention relates generally to mobile wallets and, more particularly, to cognitive mobile wallet management.

Mobile wallets allow users to preload a certain amount of money in an account that has been created through a mobile wallet service provider, and spend the money at online and brick-and-mortar merchants listed with the mobile wallet service provider. For example, if a user goes to coffee shop A, which is listed with XYZ mobile wallet, she can pay for her coffee using her phone. Depending on the service provider, she could also pay through a mobile app, a text message, a social media account or a website. Such mobile wallets are frequently used for gift cards, or specific purchases such as boarding passes or event tickets, while in marketing they are a popular vehicle for sale messaging, coupons, and promotional offers. The financial services sector is undergoing major disruption, and mobile payment systems are one example of a disrupting technology in this sector.

Various methods have been developed to assist users in managing mobile wallets, including the use of parental controls for restricting access to funds based on one or more fixed rules. However, there remains a need for control systems and methods that enable automatic yet flexible management of mobile wallets.

SUMMARY

In an aspect of the invention, a computer-implemented for cognitive mobile wallet management, includes: obtaining, by a computing device, user contextual data; determining, by the computing device, a potential user purchase and an associated purchase category; and dynamically determining, by the computing device, a flexible spending rule for the purchase category based on one or more stored spending rules and the contextual data, wherein the flexible spending rule changes an amount of currency available to a user through the computing device. Advantageously, embodiments of the invention do not rely solely on fixed rules or spending limits to determine a user's access to currency, but instead allow for dynamic adjustment of currency access based on factors (contextual data) likely to influence spending of the user.

In embodiments, the method further comprises analyzing historic spending data to determine a baseline spending limit for the purchase category, wherein the flexible spending rule comprises adjusting the baseline spending limit. In this way, the method allows for flexible spending rules to be determined based on historic spending data.

In another aspect of the invention, there is a computer program product for cognitive mobile wallet management. The computer program product comprises a computer readable storage medium having program instructions embodied therewith. The program instructions are executable by a computing device to cause the computing device to: obtain user contextual data; determine a potential user purchase and an associated purchase category; determine a baseline spending limit for the purchase category; dynamically determine a flexible spending rule for the purchase category based on one or more stored spending rules and the contextual data, wherein the flexible spending rule comprises a flexible spending limit different from the baseline spending limit; and initiate a digital purchase, wherein the digital purchase is less than or equal to the flexible spending limit. Advantageously, rather than relying only on fixed rules, embodiments of the invention dynamically determine flexible spending rules based on contextual data.

In embodiments, the contextual data is selected from one or more of the group consisting of location data, ambient sound data, physiological data, ambient scent data, ambient temperature data, social media data, historic purchase data and user feedback data. Thus, embodiments of the invention enable dynamic adjustment of a user's access to currency based on real-time user contextual data selected from the group above.

In another aspect of the invention, there is a system for cognitive mobile wallet management. The system includes a CPU, a computer readable memory and a computer readable storage medium associated with a computing device; program instructions to obtain user contextual data; program instructions to determine a potential user purchase and an associated purchase category; and program instructions to dynamically determine a flexible spending rule for the purchase category based on one or more spending rules in a rules database and the contextual data, wherein the program instructions are stored on the computer readable storage medium for execution by the CPU via the computer readable memory.

In embodiments, the system further includes: program instructions to present rule options to a user, wherein the rule options enable the user to select weights of the contextual data; program instructions to receive a user selection of weights of the contextual data; and program instructions to store the weights of the contextual data in the rules database, wherein the flexible spending rule for the purchase category is determined, in part, based on the weights of the contextual data. Advantageously, embodiments of the invention enable a user to select weights of different types of contextual data such that the influence of contextual data on the resulting flexible spending rule may differ for different types of contextual data.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
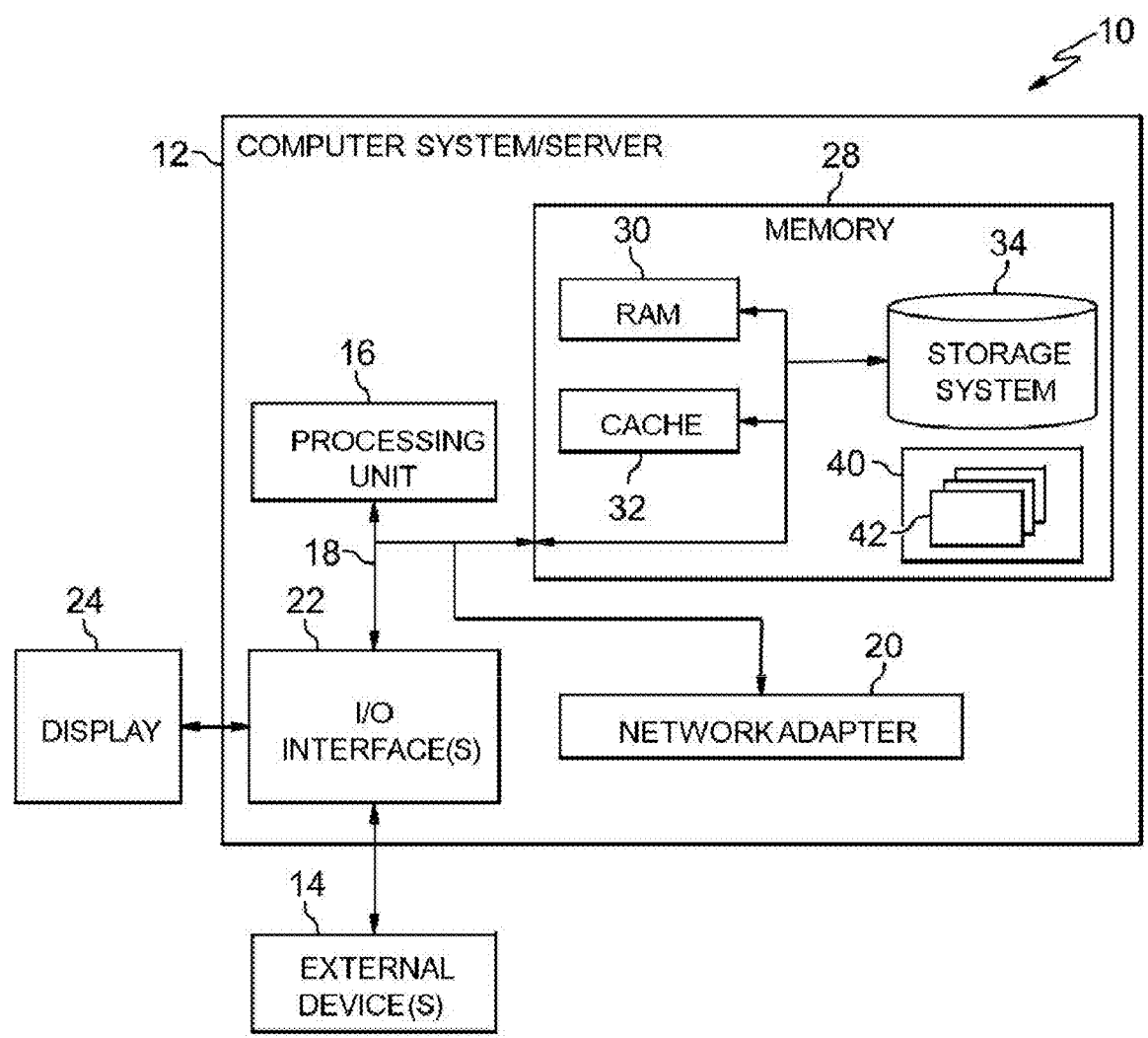
FIG. 1 depicts a computing infrastructure according to an embodiment of the present invention.

The present invention relates generally to mobile wallets and, more particularly, to cognitive mobile wallet management. In embodiments, a cognitive, real-time mobile wallet management system analyzes a user's broad context (contextual data), looking at: historical spending patterns; body sensor data (e.g., heart rate, voice pattern, and other stress and mood indicators); environmental factors (e.g., detecting a scent infused in the air to promote shopping, detecting music intended to promote shopping, temperature, etc.); shopping opportunities physically close to the user (e.g., shops, individual items); social network information on the items to be purchased; and spending guidelines as communicated by a user or an authorized individual. In embodiments, based on a statistical analysis of the user's contextual data, a mobile wallet will: encourage a purchase, topping up the wallet if necessary; discourage a purchase by distracting the user; or prevent a purchase by temporarily locking the wallet. In embodiments of the invention, a cognitive mobile wallet continuously monitors the environment, user parameters and product information to dynamically adjust currency available to a user (e.g., spending limits) in real time or near real time. In aspects, crowd sourcing is utilized as a data point when arriving at a decision to change a spending limit.

Embodiments of the invention address the technical problem of managing access to currency for mobile digital payment systems by providing a system and method that dynamically adjusts a user's access to currency based on real-time user contextual data. Advantageously, embodiments of the invention do not rely solely on preset (fixed) rules or spending limits to determine a user's access to currency, but instead allow for dynamic adjustment of currency access based on factors likely to influence spending of the user. Moreover, embodiments of the invention provide for cognitive learning of a user's spending habits and associated contextual data influencing the user's spending habits to more effectively manage the user's access to currency in real-world environments. By way of example, a mobile wallet device of the present invention may recognize the presence of a chemical scent that increases a user's tendency to spend money, and may dynamically lower the amount of money accessible by the user for a predetermined period of time to prevent the user from increasing their spending due to the influence of the chemical scent.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
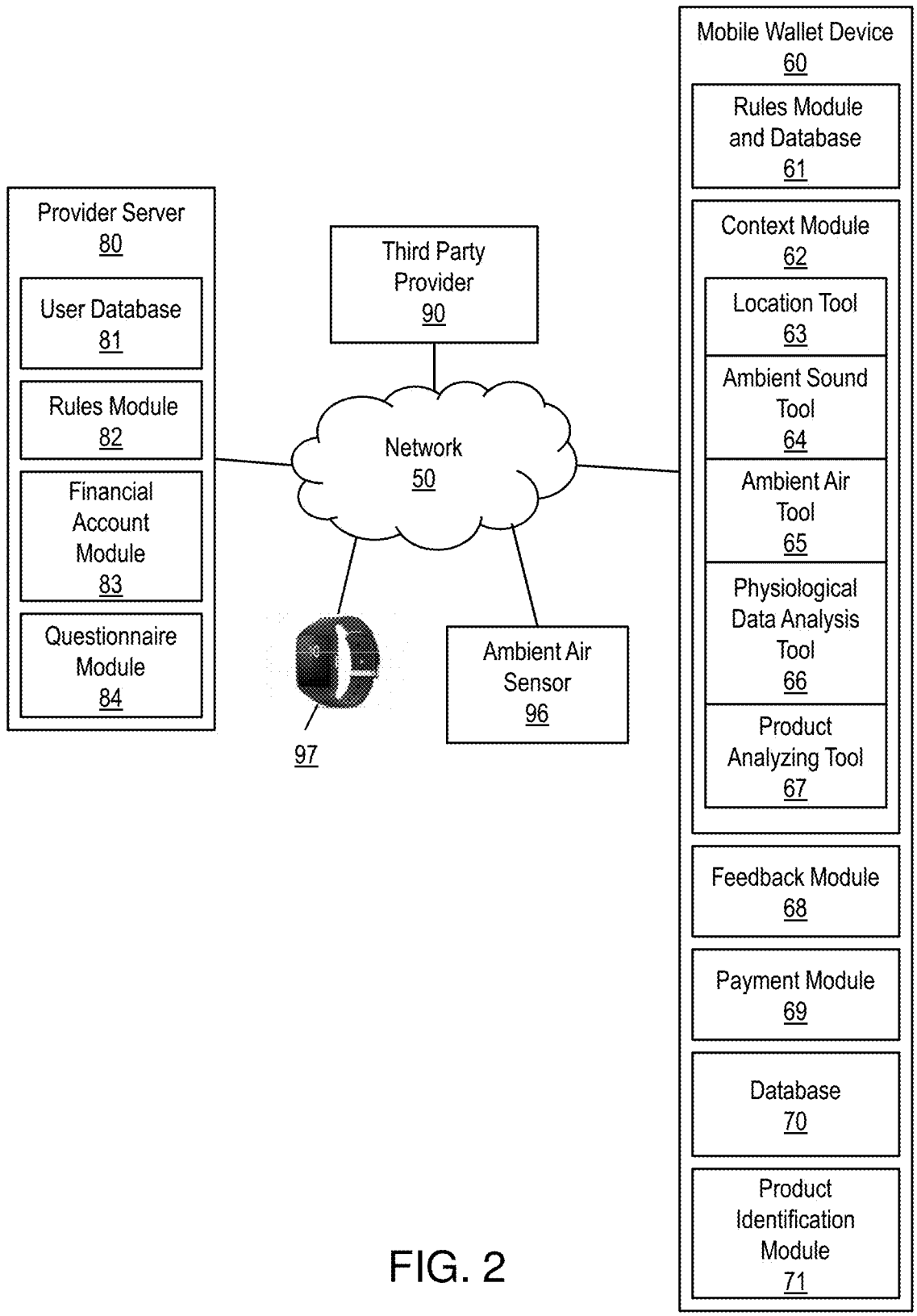
FIG. 2 shows an exemplary environment in accordance with aspects of the invention.

FIG. 2 shows an exemplary environment in accordance with aspects of the invention. The environment includes a mobile wallet device 60 connected to a network 50. The mobile wallet device 60 may comprise a computer system 12 of FIG. 1, and may be connected to the network 50 via the network adapter 20 of FIG. 1. The mobile wallet device 60 may be a general purpose computing device, such as a laptop computer, tablet computer, smartphone, etc., or may be configured as a special purpose computing device for mobile digital payments.

The network 50 may be any suitable communication network or combination of networks, such as a local area network (LAN), a general wide area network (WAN), and/or a public network (e.g., the Internet). The mobile wallet device 60 may be connected to a provider server 80 through the network 50. The provider server 80 may be a financial provider server, such as a bank server, and may comprise elements of the computer system 12. The mobile wallet device 60 may be further connected to one or more third party service providers, indicated at 90, through the network 50. In embodiments, the mobile wallet device 60 is further connected to one or more contextual data gathering devices (e.g., sensors), such as an ambient air sensor 96 or a smartwatch 97, either directly (direct connection or wireless connection) or through the network 50, as depicted in FIG. 2.

Still referring to FIG. 2, the mobile wallet device 60 may comprise a plurality of modules configured to perform one or more of the functions described herein. In embodiments, the mobile wallet device 60 includes a rules module and database 61 (hereafter rules module 61), a context module 62, a feedback module 68, a payment module 69, and a product identification module 71, which may each comprise one or more program modules (e.g., program module 42 of FIG. 1) executed by the mobile wallet device 60. In embodiments, rules module 61 is configured to store rules related to purchase categories, such as food, clothing, jewelry, etc. In embodiments, context module 62 is configured to gather and store user contextual data such as location data, ambient sound data, physiological data, ambient scent data, ambient temperature data, social media data, historic purchase data and user feedback data. Sensors that may be utilized with the mobile wallet device 60 to gather user contextual data include, for example, assisted global positioning systems (GPS), pulse rate monitors, body temperature monitors, stress monitors, ambient temperature sensors, ambient air sensors, and live music sensors.

As depicted in FIG. 2, a plurality of tools may provide the user contextual data to the context module 62, including a location tool 63 (e.g., global positioning device), an ambient sound tool 64, an ambient air tool 65, a physiological data analysis tool 66, a product analyzing tool 67 for gathering information regarding products, the ambient air sensor 96 and the smartwatch 97. The mobile wallet device 60 may further include a database 70 for storing user spending data. In embodiments, the feedback module 68 is configured to collect user satisfaction feedback regarding purchases made by the user. In embodiments, the payment module 69 is configured enable mobile digital purchases. The payment module 69 may utilize mobile wallet applications configured to communicate with the provider server 80.

In embodiments, the provider server 80 includes a user database 81 for storing user information (e.g., name, address, account identifiers, etc.), and a plurality of modules related to the use of the mobile wallet device 60 to conduct digital payments. In embodiments, provider server 80 includes a rules module 82, a financial account module 83 and a questionnaire module 84, which may each comprise one or more program modules (e.g., program module 42 of FIG. 1) executed by the provider server 80. In aspects, the rules module 82 enables one or more users to set rules related to purchase categories. In aspects, the financial account module 83 provides one or more users with access to currency, digitally. In aspects, the questionnaire module 84 enables users to create questionnaires, send questionnaires to one or more users, and obtain user feedback data based on the questionnaires, wherein the feedback data obtained can be utilized in the modification of rules in the rules module 82.

Figure 3:
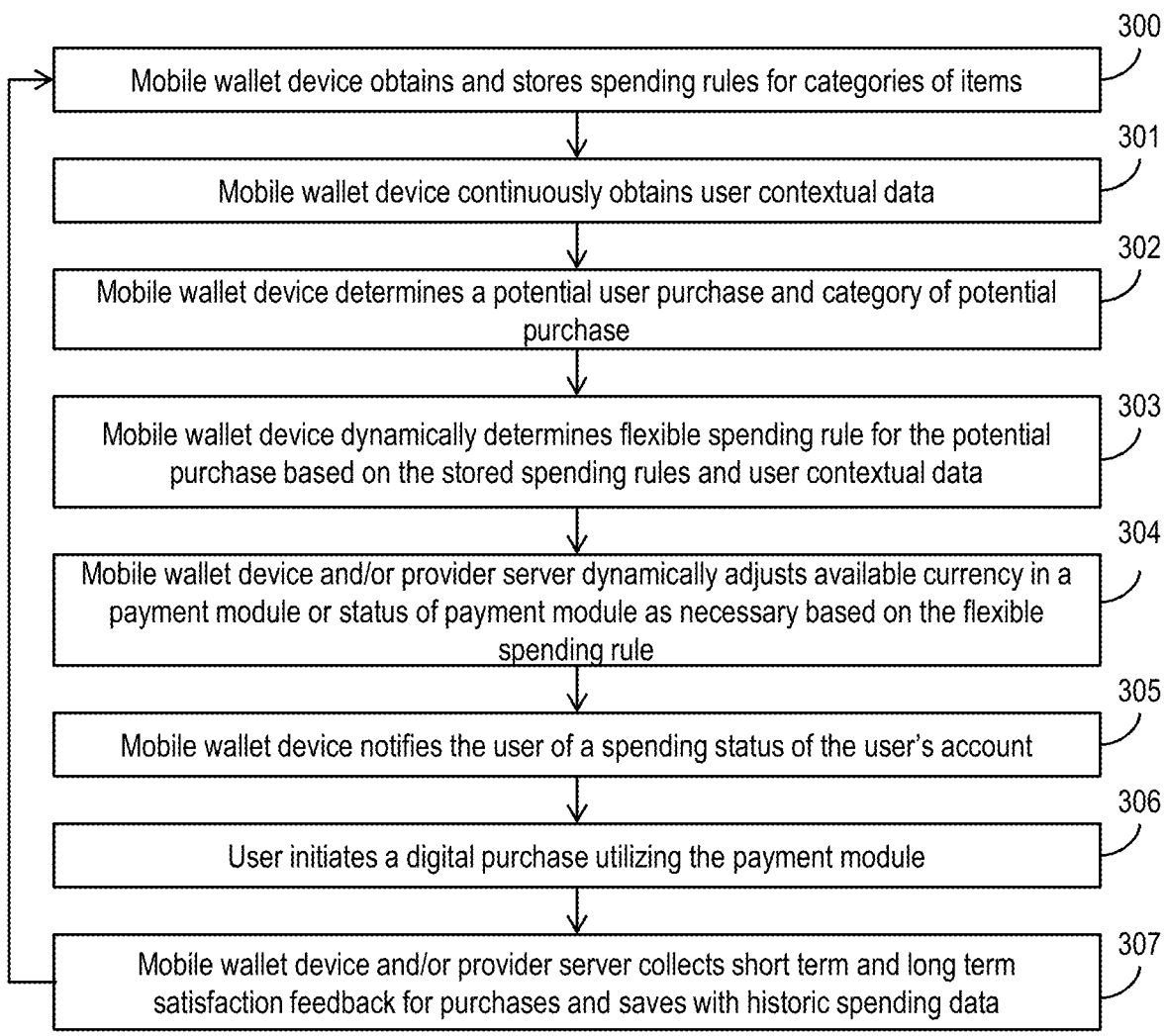
FIG. 3 shows an exemplary flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

At step 300, the mobile wallet device obtains and stores spending rules for a plurality of purchase categories. In embodiments, a user can set a number of user preferences (spending rules), including preferred weights for a plurality of user contextual data types and maximum allowable variations to baseline spending limits per purchase category. By way of example, the mobile wallet device 60 may present a user with options to take social media trends, scents, music or body sensor data into account "not at all", "somewhat", or "a lot", and the user's selection may be stored in the rules database 61 as spending rules. In embodiments, a hierarchy of authorized parties is enabled to set the spending rules. For example, a mobile wallet issuer (e.g., bank, payment provider) may have control over all spending rules, a custodian (e.g., parent, employer) may have control over some of the spending rules, and the user of the mobile wallet device 60 (end user) may have control over the smallest number of spending rules. It should be understood that the establishment and modification of spending rules can occur in an ongoing basis utilizing, for example, data gathered during steps 301-307.

In aspects, the mobile wallet device 60 sets one or more baseline spending rules (starting limit per purchase category) utilizing historic purchasing data of a user. In embodiments, the mobile wallet device 60 obtains historic purchasing data from the database 70, which may include historic purchasing data obtained from a third party provider 90 (e.g., historic online shopping data from an online retailer). In aspects, the mobile wallet device 60 automatically sets baseline spending rules (e.g., spending limits) based on historic purchase data of the user, and saves the baseline spending rules in the rules database 61. In embodiments, the mobile wallet device 60 may present suggested spending limits to a user during a rule setting stage. For example, the mobile wallet device 60 may notify a user that they spend an average of X dollars per month on the purchase category "clothing", and may enable a user to select X dollars per month as the spending limit for the category "clothing". In embodiments, the rules module 82 at the provider server 80 communicates with the rules module 61 of the mobile wallet device 60, such that an administrator or participant may modify rules data at either the provider server 80 or the mobile wallet device 60 and shared the rules between the provider server 80 and the mobile wallet device 60. The user database 81 may contain data from multiple users to enable the provider server 80 to communicate appropriate user data with various mobile wallet devices (e.g., 60).

At step 301, the mobile wallet device 60 continuously obtains user contextual data. In embodiments, the context module 62 obtains user contextual data through one or more tools, such as the location tool 63, the ambient sound tool 64, the ambient air tool 65, the physiological data analysis tool 66, the produce analyzing tool 67, the ambient air sensor 96 and the smartwatch 97. User contextual data may include any contextual data that can affect a user's decision making regarding a purchase. By way of example, marketers are known to utilize chemical additives (e.g., scents) in the air to promote purchasing by consumers. Accordingly, the context module 62 may gather ambient air data through the ambient air sensor 96 in order for the ambient air tool 65 to determine if the user is in the presence of chemical additives. In aspects, the context module 62 may "learn" that certain chemical additives cause a user to increase spending by correlating purchase data with the presence of chemical additives and monitoring any increase in spending in the presence of the chemical additive over time. Similarly, the context module 62 may correlate other types of contextual data, such as ambient temperature and humidity, with an increase in spending, and store the contextual data in the database 70 for future use.

By way of another example, marketers may utilize certain music in an attempt to promote purchase activity. Accordingly, the context module 62 may gather music data through the ambient sound tool 64 (e.g., a microphone of the mobile wallet device 60) to determine if any music data is or can be correlated with an increase in purchase activity by a user of the mobile wallet device 60. In another example, user purchase activity may be influenced by a user's stress level, mood, etc. Accordingly, the context module 62 may gather physiological data of the user (e.g., heart rate data from the smartwatch 97 or voice data from the ambient sound tool 64) and may utilize the physiological data analysis tool to determine the user's current stress level, mood, etc. In aspects, the context module 62 may utilize historic purchase data to correlate physiological data with any increase in purchase activity, and may store the correlated purchase and physiological data for future use. Similarly, the context module 62 may establish correlations between purchase activity and location, based on location data gathered by the location tool 63, and may store this correlated data for future user. In embodiments, the context module 62 gathers social media data (e.g., from the third party provider 90) and analyzes the data to determine any correlations between items or services for sale and purchase influencing data, such as popularity of the items/services and trends. In embodiments, historic pricing data is also gathered and stored by the context module 62, which may be utilized at a later date to determine pricing trends.

In embodiments, the provider server 80 may gather data collected by the context modules (e.g., 62) of multiple mobile wallet devices (e.g., 60) and utilize the gathered data to build a database of user contextual data determined to cause an increase in purchase activity of the mobile wallet device users. Accordingly, the provider server 80 may obtain a large set of observed shopping behavior from multiple mobile wallet device users 60. For example, context data and spending data gathered by the provider server 80 may indicate that the presence of a certain scent causes a statistically significant increase in consumer spending.

Still referencing FIG. 3, at step 302, the mobile wallet device 60 determines a potential user purchase and a purchase category associated with the potential user purchase. In embodiments, the product identification module 71 is utilized to determine a potential user purchase item or service, and the associated purchase category of the item or service (e.g., a shirt within the purchase category of "clothing"). A variety of techniques may be utilized in accordance with step 302. By way of example, the mobile wallet device 60 may recognize a potential user purchase and purchase category when the user initiates a purchase utilizing the mobile wallet device 60, and the mobile wallet device 60 receives information regarding an item through communication of the mobile wallet device 60 with a retailer/service provider. In another example, a camera (not shown) of the mobile wallet device 60 may capture image data and may recognize items utilizing photo recognition software utilized by the product identification module 71. In another example, the mobile wallet device 60 may determine a potential user purchase and a purchase category when a scanner (not shown) of the mobile wallet device 60 is utilized by a user to scan an item (such as when checking the price of an item). Smart shopping techniques may also be utilized in accordance with step 302, such as radio frequency identification (RFID) tags on items, smart shelves, intelligent shopping carts, etc. In other embodiments, a user can manually input an indication of a potential user purchase and associated purchase category in the mobile wallet device 60. In yet other embodiments, the mobile wallet device 60 may recognize a potential user purchase when a user is in the proximity of a store.

At step 303, the mobile wallet device 60 dynamically determines a flexible spending rule based on the purchase rules stored in the rules module 61 (e.g., spending limits per category) and user contextual data gathered by the context module 62. By way of example, the mobile wallet device 60 may determine, based on user contextual data, that a user is in the presence of a scent that tends to increase spending, that the user's typical spending limit for an item of interest is $50.00, and that the mobile wallet device 60 should prevent the user from spending money when under the influence of the scent, based on purchase rules stored in the rules module 61. Accordingly, the mobile wallet device 60 may determine a flexible spending rule that prevents the user from spending more than half of the spending limit ($25.00) while in the presence of the scent, thereby dynamically limiting the user's ability to purchase the item of interest.

At step 304, the mobile wallet device 60 or the provider server 80 may dynamically adjust the currency available to the user, as necessary, based on the flexible spending rule determined at step 303. In embodiments, the mobile wallet device 60 communicates a new temporary spending limit to the provider server 80 based on the flexible spending rule, and the provider server 80 adjusts the currency available to a user through the financial account module 83. In alternative embodiments, the payment module 69 of the mobile wallet device 60 adjusts currency available to the user through the mobile wallet device 60 based on the flexible spending rule determined at step 303. In embodiments, the flexible spending rule causes the mobile wallet device 60 to instruct the payment module 69 of the mobile wallet device 60 to adjust the baseline spending limit by degrees up or down, or suspend the ability of the user to utilize the mobile wallet device 60 for purchases (e.g., lock spending of the mobile wallet device 60). In alternative embodiments, the flexible spending rule comprises an adjustment to the baseline spending limit for the purchased category or the item/services to be purchased, and the mobile wallet device 60 communicates the determined adjustment to the baseline spending limits to the financial account module 83 of the provider server 80. In embodiments, the adjustment to a baseline spending limit is set for a predetermined period of time based on the determined spending rule from step 303. In embodiments, the flexible spending rule causes the mobile wallet device 60 to adjust the baseline spending limit based on an analytical model that takes into account weights assigned to different types of contextual data.

At step 305, the user may be notified regarding a spending status of a user's account based on the determined flexible spending rule of step 303. By way of example, the mobile wallet device 60 may display a notification to the user indicating that: currency available to the user for mobile digital purchases has been increased, currency available to the user for mobile digital purchases has been decreased, or no currency is presently available to the user for mobile digital purchases. In embodiments, the notification may be received from the provider server 80.

At step 306, the user may initiate a purchase utilizing the payment module 69 of the mobile wallet device 60. Various methods for initiating a purchase through the mobile wallet device 60 may be utilized. In embodiments, step 306 does not occur, such as when a user is not permitted to make a purchase (e.g., no currency is available based on a flexible spending rule determined at step 303).

At step 307, the mobile wallet device 60 may collect and stored user satisfaction feedback in the database 70 for future use by the mobile wallet device 60. In aspects, the mobile wallet device 60 utilizes the satisfaction feedback collected at step 307 in the setting of rules at step 300. In embodiments, a questionnaire module 84 of the provider server 80 provides questionnaires to the user through the mobile wallet device 60, enabling the provider server 80 to receive targeted feedback from the user regarding user purchases.

Figure 4:
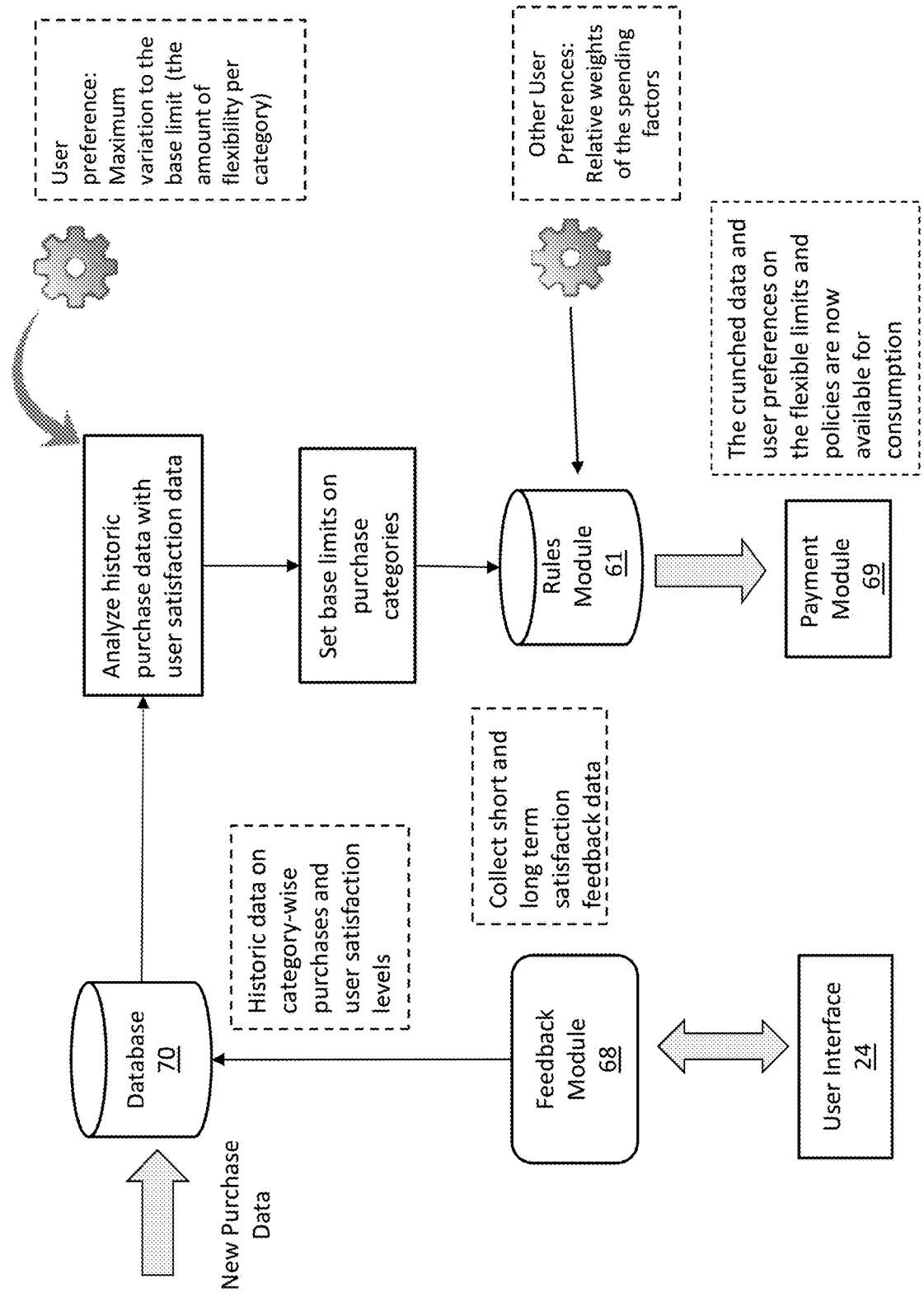
FIG. 4 depicts feedback mechanisms utilized by embodiments of the invention.

FIG. 4 depicts feedback mechanisms utilized by embodiments of the invention. As depicted in FIG. 4, new purchase data collected after initiation of a digital purchase at step 306 of FIG. 3 is gathered by the mobile wallet device 60 and stored in the database 70. The feedback module 68 collects short and long term user satisfaction feedback data in accordance with step 307 of FIG. 3, and the satisfaction feedback data is correlated with associated purchase data in the database 70. The Table below depicts exemplary purchase data and associated feedback (satisfaction) data. In embodiments, the feedback module 68 collects user satisfaction feedback data only for major purchases (e.g., purchases over a predetermined threshold price). The mobile wallet device 60 may utilize purchase data in the database 70 with associated user satisfaction data and any user preference limits from the rules module 61 to automatically generate base spending limits per purchase category in accordance with step 300 of FIG. 3, and save the base spending limits in the rules module 61.

Exemplary Purchase and Satisfaction Data

| Category | Item | # | Totals$ | Satisfaction Score | | |
|---|---|---|---|---|---|---|
| | | | | 1 day | 7 days | 1 month |
| Jewelry | earrings | 22 | 4000 | 9 | 2 | 0 |
| Jewelry | rings | 10 | 3000 | 9 | 2 | 1 |
| Shoes | running shoes | 5 | 500 | 10 | 5 | 4 |
| Grocery | cereal | 15 | 100 | 10 | 10 | 9 |

Figure 5:
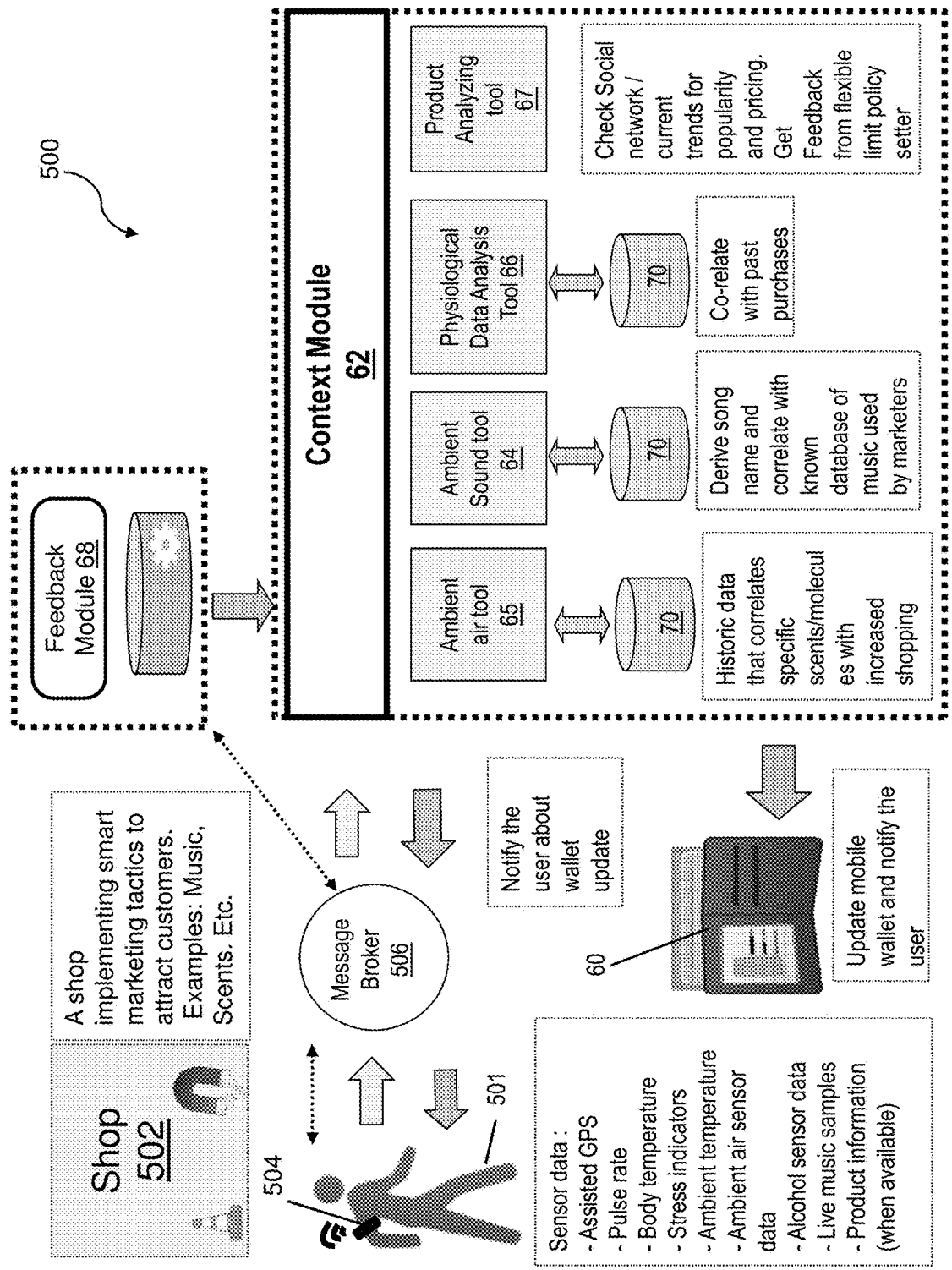
FIG. 5 depicts a cognitive mobile wallet management system 500 of the invention.

FIG. 5 depicts an exemplary schematic in accordance with embodiments of the invention. FIG. 5 depicts a cognitive mobile wallet management system 500 of the invention, wherein a third party provider server 80 communicates with a user's mobile wallet device 60 to provide mobile wallet services. A user 501 is shown in the vicinity of a shop 502 that is utilizing smart marketing tactics to attract customers, such as music, scents, etc. A message broker provided by the provider server 80 utilizes message broker technology indicated at 506 (e.g., server implementation of MQTT protocol, distributed streaming platform, etc.) to communicate with the context module 62 (e.g., provide sensor data to the context module 62). FIG. 5 depicts the use of sensor data including data from assisted GPS, pulse rate data, body temperature data, stress indicator data, ambient temperature data, ambient air sensor data, live music data and product information data (when available). The context module 62 of FIG. 5 includes an ambient air tool 65, an ambient sound tool 64, a physiological data analysis tool 66 and a product analyzing tool 67. The message broker 506 is in further communication with the feedback module 68, which is configured to adjust spending rules for categories of items based on contextual data and purchase data gathered by the system 500. Exemplary use scenarios for the invention will now be discussed with reference to FIGS. 2, 3 and 5. While the embodiment of FIG. 5 shows the use of a message broker, other methods for communicating data with the context module 62 may be utilized in implementing the invention. By way of example, the mobile wallet device 60 may upload collected sensor data directly to a secure web server (not shown) and the context module 62 may fetch this collected data from the secure web server.

Example 1: Mobile Wallet Locks or Reduces Available Currency

In a first scenario, the user 501 wishes to avoid impulse shopping, and requests that the user's financial institution (provider server 80) enable a cognitive mobile wallet management system 500 of the invention. The user goes out shopping, and is on the verge of entering the shop 502 when the user's mobile wallet device 60 vibrates to communicate with him that his mobile wallet balance has been temporarily reduced or locked based on flexible spending rules determined in accordance with step 303 of FIG. 3. In this scenario, GPS technology on the user's mobile wallet device 60 gathers location data in accordance with step 301 of FIG. 3 and, based on rules in the rules module 61, the context module 62 recognizes that the user is in close proximity to the shop 502. Moreover, physiological data from a wearable device 504 is collected by the context module 62 in accordance with step 301 of FIG. 3, and based on data stored in the rules module 61, the context module 62 recognizes that the user 501 is about to make an impulse purchase that he may regret later. Accordingly, the mobile wallet device 60 determines a flexible spending rule comprising instructions the payment module 69 of the user's mobile wallet device 60 to reduce the user's spending limit (available currency) for the next 1 hour, in accordance with step 304 of FIG. 3.

Example 2: Mobile Wallet Available Currency Increases

In a second scenario user 501 is near an educational supply store. In accordance with step 301 of FIG. 3, the user's mobile wallet device 60 gathers location data (user contextual data). Historic data stored within database 70 suggests that the user 501 typically spends $300 on educational supplies at the same time every year, and that the user 501 has not made any purchase of educational supplies in the past 2 months. Thus, in accordance with step 303 of the FIG. 3, the context module 62 determines the appropriate modification to baseline spending limits for the category of "educational supplies" and communicates the baseline spending limit to the payment module 69. In accordance with step 304 of FIG. 3, available currency is adjusted from $75 to $310, and in accordance with step 305 of FIG. 3, a notification is sent to the user 501 suggesting that the user 501 may wish to purchase educational supplies.

Example 3: Mobile Wallet Currency Adjusted Based on Social Factors

In example, 3, the user 501 is a family member having set budget goals (rules) that limit the user's total spending in any given "location" dynamically based on the type of store (e.g., purchase category or categories) so that the user does not overspend their monthly allotment in one shop (e.g., shop 502). In this scenario, the system 500 allows environment sensors or social media data to influence the spending allotment per store up or down depending on what is happening in real time. For example, if the user 501 has $300 in her mobile wallet account, and her monthly clothing budget is $80, the system 50 recognizes that the user 501 is walking into a clothing shop and initially limits the currency available on her mobile wallet account to $80 (based on spending rules in the rules database 61). When the user 501 scans a dress (utilizing a scanner of the mobile wallet device 60), the system 500 recognizes that the dress is a dress that has been discussed on the user's social media account for two weeks (e.g., utilizing data collected by the product analyzing tool 67), and the system 500 determines a flexible spending rule that causes the mobile wallet device 60 to temporarily raise the currency available to the user from $80 (based on spending rules in the rules database 61) to $100 because of the social media analysis (user contextual data). In this way, the system 500 allows for real-time flexible spending adjustments of a mobile wallet account to manage the mobile wallet account in a dynamic way.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, users of mobile wallet technology. In return, the service provider can receive payment from the customer(s) under a subscription and/or fee agreement and/or the service provider can receive payment from the sale of advertising content to one or more third parties.

In still another embodiment, the invention provides a computer-implemented method for cognitive mobile wallet management. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for cognitive mobile wallet management, comprising:
   accessing, by a computing device, historic purchase data of a user;
   obtaining, by the computing device, user contextual data over time, wherein the contextual data comprises historic sensor data;
   determining, by the computing device, a correlation between an increase in purchase activity of the user and a type of contextual data based on the historic purchase data of the user and the user contextual data, wherein the type of contextual data is associated with an increase in the purchase activity of the user;
   storing, by the computing device, the type of contextual data in a database of stored user contextual data determined to cause an increase in purchase activity of the user;
   continuously monitoring, by the computing device, an environment of the user for the type of contextual data associated with an increase in purchase activity of the user by obtaining;
   real-time data from one or more remote sensors in communication with the computing device, wherein the real-time data comprises data regarding environmental factors at a location of the user;
   determining, by the computing device, a potential purchase of the user and an associated purchase category;
   accessing, by the computing device, the database of stored user contextual data determined to cause an increase in purchase activity of the user;
   determining, by the computing device, the real-time data from the one or more remote sensors includes the type of contextual data associated with an increase in the purchase activity of the user;
   sending, by the computing device, a temporary spending limit to a remote provider server providing the user with access to currency, digitally, wherein the temporary spending limit is based on the determining the real-time data from the one or more remote sensors includes the type of contextual data associated with an increase in the purchase activity of the user, wherein the spending limit comprises an amount of currency available to the user through the computing device for a period of time, and wherein the remote provider server dynamically adjusts currency available to the user based on the temporary spending limit; and
   conducting, by the computing device, a digital purchase via a payment module of the computing device configured to communicate with the remote provider server, wherein the determining potential purchase of the user and an associated purchase category comprises at least one selected from the group consisting of:
   receiving, by the computing device, information regarding an item from a retailer;

capturing, by the computing device, image data and recognizing an item using photo recognition software; and utilizing, by the computing device, a scanner to scan an item.

2. The method of claim 1, wherein:

the real-time data from the one or more remote sensors is selected from one or more of the group consisting of: ambient sound data; physiological data of the user; ambient air sensor data; ambient temperature data; and ambient humidity data; and wherein the determining the correlation between an increase in purchase activity of the user and the type of contextual data comprises determining a correlation between one or more of the group consisting of: user purchase data and music data; user purchase data and physiological data for the user; user purchase data and ambient temperature data for the user; user purchase data and ambient humidity data for the user; user purchase data and ambient air sensor data for the user.

3. The method of claim 1, further comprising analyzing historic spending data to determine a baseline spending limit for the purchase category.

4. The method of claim 1, further comprising notifying the user of a spending status of the potential purchase.

5. The method of claim 1, further comprising:

accessing, by the computing device, social media data of the user which references a second potential purchase of the user;

increasing, by the computing device, an amount of currency available for the second potential purchase of the user based on the social media data; and sending, by the computing device, a notification to the user that additional currency is available.

6. The method of claim 1, further comprising collecting, by the computing device, user satisfaction feedback for the digital purchase.

7. A computer program product for cognitive mobile wallet management, the computer program product comprising a computer readable storage medium having program instructions embodied therewith, the program instructions executable by a computing device to cause the computing device to:

access historic purchase data of a user;

obtain user contextual data over time, wherein the contextual data comprises historic sensor data;

determine a correlation between an increase in purchase activity of the user and a type of contextual data based on the historic purchase data of the user and the user contextual data, wherein the type of contextual data is associated with an increase in the purchase activity of the user;

store the type of contextual data in a database of stored user contextual data determined to cause an increase in purchase activity of the user;

continuously monitor an environment of the user for the type of contextual data associated with an increase in purchase activity of the user by obtaining real-time data from one or more remote sensors in communication with the computing device, wherein the real-time data comprises data regarding environmental factors at a location of the user;

determine a potential purchase of the user and an associated purchase category;

access the database of stored user contextual data determined to cause an increase in purchase activity of the user;

determine the real-time data from the one or more remote sensors includes the type of contextual data associated with an increase in the purchase activity of the user;

send a temporary spending limit to a remote provider server providing the user with access to currency, digitally, wherein the temporary spending limit is based on the determining the real-time data from the one or more remote sensors includes the type of contextual data associated with an increase in the purchase activity of the user, wherein the spending limit comprises an amount of currency available to the user through the computing device for a period of time, and wherein the remote provider server dynamically adjusts currency available to the user based on the temporary spending limit; and conduct a digital purchase via a payment module of the computing device configured to communicate with the remote provider server, wherein the determining potential purchase of the user and an associated purchase category comprises at least one selected from the group consisting of:

receive information regarding an item from a retailer;

capture image data and recognizing an item using photo recognition software; and utilize a scanner to scan an item.

8. The computer program product of claim 7, wherein:

the real-time data from the one or more remote sensors is selected from one or more of the group consisting of: ambient sound data; ambient air sensor data; ambient temperature data; and ambient humidity data; and wherein the determining the correlation between an increase in purchase activity of the user and the type of contextual data comprises determining a correlation between one or more of the group consisting of: user purchase data and music data; user purchase data and ambient temperature data for the user; user purchase data and ambient humidity data for the user; user purchase data and ambient air sensor data for the user.

9. The computer program product of claim 7, further comprising program instructions to further cause the computing device to receive and store the one or more spending rules for the purchase category.

10. The computer program product of claim 7, further comprising program instructions to further cause the computing device to analyze historic spending data to determine baseline spending limit for the purchase category.

11. The computer program product of claim 7, further comprising program instructions to further cause the computing device to notify the user of a spending status of the potential purchase.

12. The computer program product of claim 7, further comprising program instructions to further cause the computing device to receive a notification from the remote provider server of currency available for the digital purchase.

13. The computer program product of claim 7, further comprising program instructions to:

access social media data of the user which references a second potential purchase of the user;

increase an amount of currency available for the second potential purchase of the user based on the social media data; and send a notification to the user that additional currency is available.

14. A system for cognitive mobile wallet management, comprising:

a CPU, a computer readable memory and a computer readable storage medium associated with a computing device;

program instructions to access historic purchase data of a user;

program instructions to obtain user contextual data over time, wherein the contextual data comprises historic sensor data;

program instructions to determine a correlation between an increase in purchase activity of the user and a type of contextual data based on the historic purchase data of the user and the user contextual data, wherein the type of contextual data is associated with an increase in the purchase activity of the user;

program instructions to store the type of contextual data in a database of stored user contextual data determined to cause an increase in purchase activity of the user;

program instructions to continuously monitor an environment of the user for the type of contextual data associated with an increase in purchase activity of the user by obtaining real-time sensor data from one or more remote sensors in communication with the computing device, wherein the real-time data comprises data regarding environmental factors at a location of the user;

program instructions to determine a potential purchase of the user and an associated purchase category;

program instructions to access the database of stored user contextual data determined to cause an increase in purchase activity of the user;

program instructions to determine the real-time sensor data from the one or more remote sensors includes the type of contextual data associated with an increase in the purchase activity of the user; and program instructions to send a temporary spending limit to a remote provider server providing the user with access to currency, digitally, wherein the temporary spending limit is based on the determining the real-time data from the one or more remote sensors includes the type of contextual data associated with an increase in the purchase activity of the user, wherein the spending limit comprises an amount of currency available to the user through the computing device for a period of time, and wherein the remote provider server dynamically adjusts currency available to the user based on the temporary spending limit; and program instructions to conduct a digital purchase via a payment module of the computing device configured to communicate with the remote provider server, wherein the determining potential purchase of the user and an associated purchase category comprises at least one selected from the group consisting of:

receive information regarding an item from a retailer;

capture image data and recognizing an item using photo recognition software; and utilize a scanner to scan an item, wherein the program instructions are stored on the computer readable storage medium for execution by the CPU via the computer readable memory.

15. The system of claim 14, further comprising continuously monitoring physiological data of the user for the type of contextual data associated with an increase in the purchase activity of the user utilizing the real-time sensor data, wherein the real-time sensor data of the user includes physiological data from a wearable device of the user;

wherein the environmental data is selected from one or more of the group consisting of: ambient sound data; ambient air sensor data; ambient temperature data; and ambient humidity data; and wherein the determining the correlation between an increase in purchase activity of the user and the type of contextual data comprises determining a correlation between one or more of the group consisting of: user purchase data and music data; user purchase data and physiological data for the user; user purchase data and ambient temperature data for the user; user purchase data and ambient humidity data for the user; user purchase data and ambient air sensor data for the user.

16. The system of claim 15, further comprising:

program instructions to present rule options to the user, wherein the rule options enable the user to select weights of the contextual data;

program instructions to receive a user selection of weights of the contextual data; and program instructions to store the weights of the contextual data in the rules database, wherein the currency available to the user is determined, in part, based on the weights of the contextual data.

17. The system of claim 14, further comprising program instructions to analyze historic spending data to determine a baseline spending limit for the purchase category.

18. The system of claim 14, further comprising:

program instructions to access social media data of the user which references a second potential purchase of the user;

program instructions to increase an amount of currency available for the second potential purchase of the user based on the social media data; and program instructions to send a notification to the user that additional currency is available.

19. The system of claim 14, further comprising program instructions to collect user satisfaction feedback for a digital purchase.

* * * * *